United States Patent
Mohanty et al.

(10) Patent No.: US 9,898,457 B1
(45) Date of Patent: Feb. 20, 2018

(54) IDENTIFYING NON-NATURAL LANGUAGE FOR CONTENT ANALYSIS

(71) Applicant: Microsoft Technology Licensing, LLC, Redmond, WA (US)

(72) Inventors: Pranab Mohanty, Redmond, WA (US); Intaik Park, Bellevue, WA (US); Kieran Brantner-Magee, Duvall, WA (US); Lucas Lin, Seattle, WA (US); Saikat Sen, Issaquah, WA (US); Korhan Ileri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/284,517

(22) Filed: Oct. 3, 2016

(51) Int. Cl.
*G06F 17/27* (2006.01)
*G06F 17/24* (2006.01)

(52) U.S. Cl.
CPC ............ *G06F 17/277* (2013.01); *G06F 17/24* (2013.01); *G06F 17/2705* (2013.01)

(58) Field of Classification Search
CPC ....................................................... G06F 17/02
USPC ........................... 704/1, 9, 10, 257, 270–275
See application file for complete search history.

(56) References Cited

U.S. PATENT DOCUMENTS

| | | | |
|---|---|---|---|
| 7,191,116 B2 * | 3/2007 | Alpha ................... | G06F 17/275 704/10 |
| 7,251,781 B2 | 7/2007 | Batchilo et al. | |
| 8,027,832 B2 * | 9/2011 | Ramsey ................ | G06F 17/275 382/187 |
| 8,275,771 B1 | 9/2012 | Malpani et al. | |
| 8,639,497 B2 | 1/2014 | Eggebraaten et al. | |
| 2005/0154578 A1 * | 7/2005 | Tong ...................... | G06F 17/218 704/5 |
| 2008/0243477 A1 * | 10/2008 | Bush ................... | G06F 17/2217 704/8 |
| 2010/0125447 A1 * | 5/2010 | Goswami .............. | G06F 17/289 704/8 |

(Continued)

OTHER PUBLICATIONS

Cerulo, et al., "A Hidden Markov Model to Detect Coded Information Islands in Free Text", In Proceedings of IEEE 13th International Working Conference on Source Code Analysis and Manipulation, Sep. 22, 2013, pp. 157-166.

(Continued)

*Primary Examiner* — Jesse Pullias
(74) *Attorney, Agent, or Firm* — Harness, Dickey & Pierce, P.L.C.

(57) ABSTRACT

Examples for detecting and removing non-natural language within natural language to enhance performing content analysis on the natural language are provided herein. A plurality of terms is identified in a phrase, and a sliding window having a defined length is placed over a first sequence of terms from the plurality of terms. The first sequence of terms includes a first term, a second term, and a third term, the first term and the third term being adjacent to the second term. Based on the first term, the second term, and the third term, a determination is made as to whether the second term represents non-natural language. Upon determining that the second term is non-natural language, the second term is labeled as non-natural language and is removed from the plurality of terms based on determining the second term as non-natural language.

20 Claims, 4 Drawing Sheets

(56) References Cited

U.S. PATENT DOCUMENTS

2010/0312545 A1* 12/2010 Sites .................... G06F 17/275
704/8
2013/0103695 A1    4/2013 Rarrick et al.

OTHER PUBLICATIONS

Merten, et al., "Classifying unstructured data into natural language text and technical information", In Proceedings of be 11th Working Conference on Mining Software Repositories, May 31, 2014, pp. 300-303.
Khayyamian, et al., "Capturing Programming Content in Online Discussions", In Proceedings of the seventh international conference on Knowledge capture, Jun. 23, 2013, 7 pages.
Bettenburg, et al., "Extracting Structural Information from Bug Reports ", In Proceedings of the international working conference on Mining software repositories, May 10, 2008, pp. 27-30.
Dutta et al. "Text normalization in code-mixed social media text", In Proceedings of IEEE 2nd International conference on Recent Trends in Information Systems, Jul. 9, 2015, pp. 378-382.
"StackExchange: Simple method for reliably detecting code in text?", Published on: May 18, 2013, 8 pages, Available at: http://programmers.stackexchange.com/questions/87611/simple-method-for-reliably-detecting-code-in-text/87650.
"Language Detection API", Retrieved on: Apr. 7, 2016, 5 pages, Available at: https://detectlanguage.com.
"Github/linguist", Retrieved on: Apr. 7, 5 pages, Available at: https://github.com/github/linguist.

* cited by examiner

IDENTIFYING NON-NATURAL LANGUAGE FOR CONTENT ANALYSIS

BACKGROUND

Content analysis is an important aspect for numerous applications, such as search engines, virus protection, advertising, data mining, and media analysis. The content that is analyzed can be in any form to begin with, but is often converted into written words before it is analyzed. The original source can be documents, broadcast programs, audio recordings, websites, email, or even live situations. While content analysis is performed on text associated with natural language (e.g., human language), natural language text often includes non-natural language (e.g., artificial language such as computer-executable language: C Language, C++, Java, JAVASCRIPT brand scripts, Structured Query Language (SQL), PYTHON brand scripts, Hypertext Processor (PHP), and the like) within the natural language text. For example, documents, E-mails, and websites (e.g., social media sites, chat rooms, and blogs) often include text that is artificial language, such as program code and program code fragments. The artificial language may be marked with a markup language tag, which makes it easy to identify and remove prior to performing content analysis on the natural language text. However, the artificial language may also appear in the form of plain text within the natural language text and thus often goes undetected and is therefore not identified or removed. As a result, during content analysis, the unidentified artificial language that has not been removed from within the natural language text is also analyzed, adding unwanted noise and/or inaccurate results to the content analysis.

SUMMARY

Examples of the disclosure involve a computer-implemented method for detecting and removing non-natural language within natural language to enhance performing analysis on the natural language. A plurality of terms is identified in a phrase. A sliding window having a defined length is placed over a first sequence of terms from the plurality of terms, the first sequence of terms that includes a first term, a second term, and a third term, the first term and the third term being adjacent to the second term. Based on the first term, the second term, and the third term, a determination is made as to whether the second term represents non-natural language. Upon determining that the second term is non-natural language, the second term is labeled as non-natural language and is thereafter removed from the plurality of terms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1A:
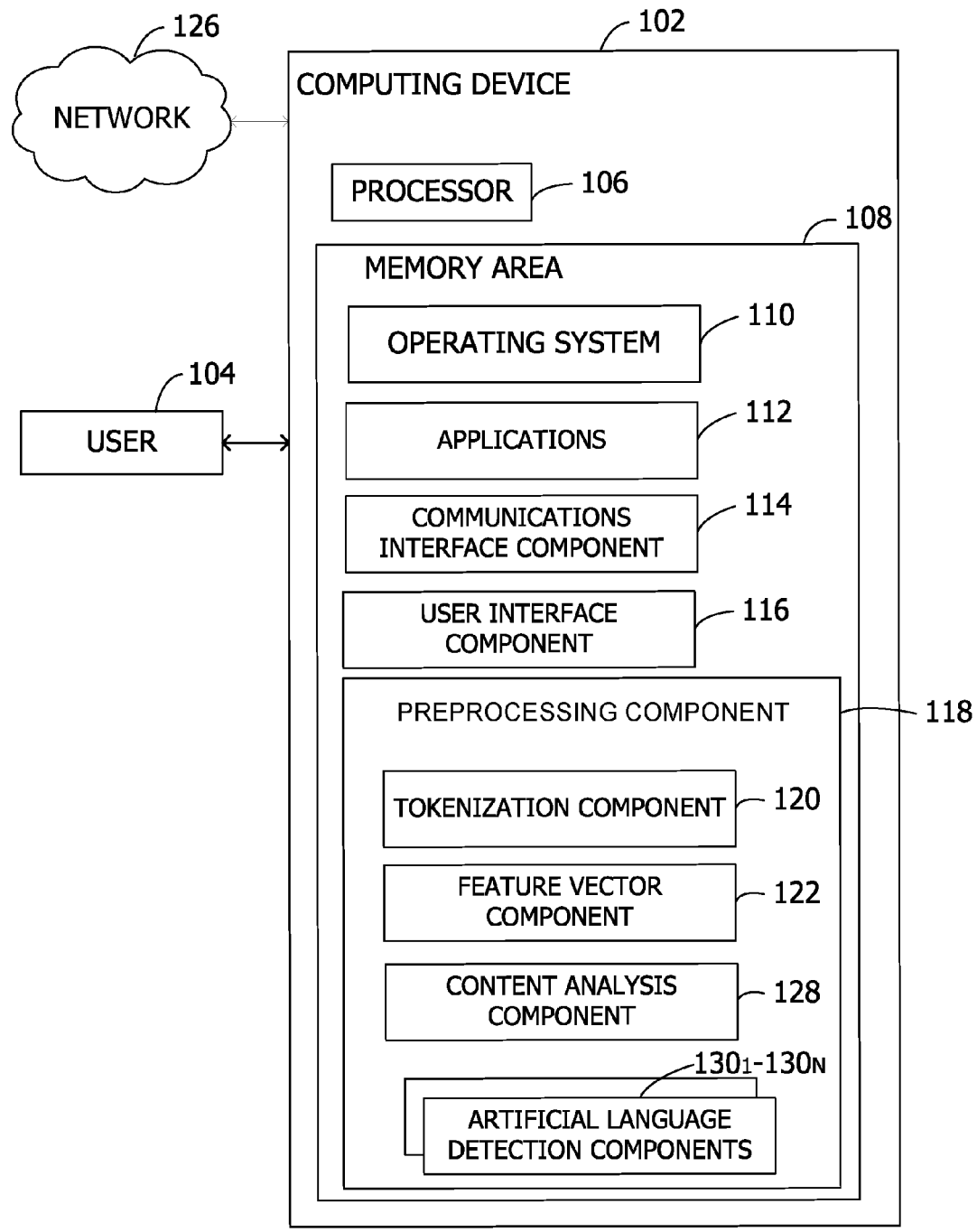
FIG. 1A is a block diagram of an operating environment for pre-processing a document that includes natural language text and artificial language.

Referring to the figures, examples of the disclosure enable a detection and removal of artificial language within a document that includes natural language text and artificial language. By identifying and removing the artificial language from the document prior to performing content analysis on the document, results of the content analysis are free of noise and inaccuracies that would exist with the inclusion of the artificial language. The term "document" is used throughout the disclosure to include electronic matter that includes a sequence of natural language text, for example, a webpage, an email, a blog entry, search results, word processing document, or any other electronic form of natural language text.

By encoding terms in a document a particular way for each of a plurality of different artificial languages, aspects of the disclosure enable multiple types of artificial languages to be identified in a document simultaneously, reducing the time spent identifying the artificial languages prior to performing content analysis. Utilizing a sliding window that is positioned around a pivot term (e.g., a centermost term in a sequence of encoded terms), aspects of the disclosure are capable of identifying a single term (e.g., the pivot term) as either artificial language or not artificial language. As such, smaller portions of artificial language (e.g., code fragments) are identifiable, thus improving the results of the content analysis. Further, by analyzing and identifying each pivot term in a sliding window as either artificial language or not artificial language, a defined boundary between natural language text and artificial language in the document can be created, improving the accuracy at which artificial language can be separated from the natural language text in the document as well as improving a user's experience when evaluating the document by providing appropriate formatting and visual delineation of the non-natural languages and allowing visual distinction to be added between the artificial language and the natural language text through text styling, spacing, and the like.

While the examples provided herein describe that pivot term as being centered within the sliding window, the pivot term may be positioned anywhere within the sliding window. Further, as used herein, a "term" may be a word, a letter, a symbol, a special character, a number, or a token. In addition, a "term" (e.g., a pivot term) may be a single term, or a plurality of terms grouped together.

Having briefly described an overview of different examples, exemplary operating environments suitable for implementing the disclosed pre-processing of text are described below. With reference to the accompanying drawings, FIGS. 1A-1C are block diagrams of different configurations for a computing device 102 with a pre-processing component 118 in communication with artificial language detection components $130_1$-$130_N$ that enable artificial language within natural language text to be detected, according to various examples.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1B:
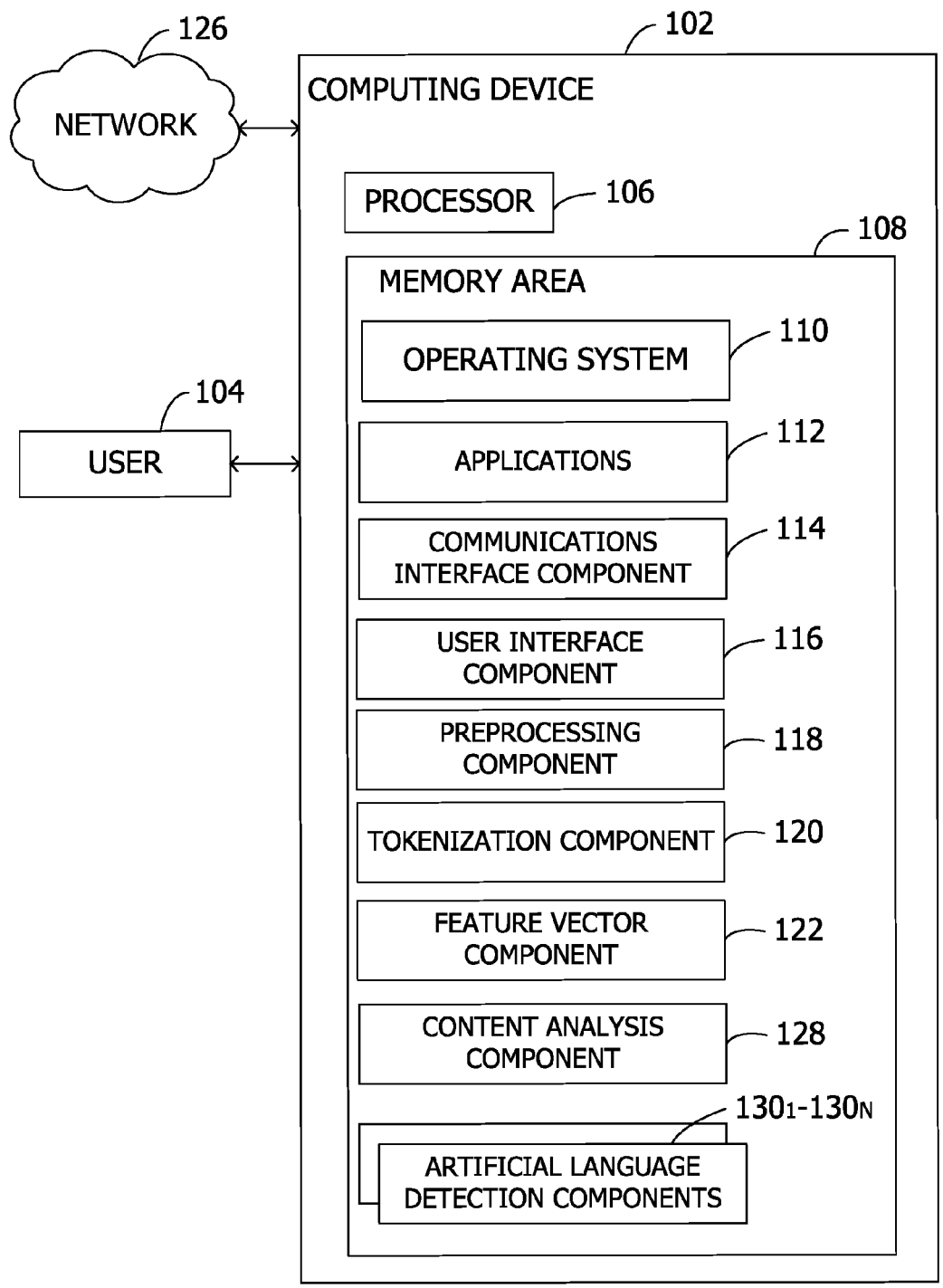
FIG. 1B is a block diagram of an operating environment for pre-processing a document that includes natural language text and artificial language.
Figure 1C:
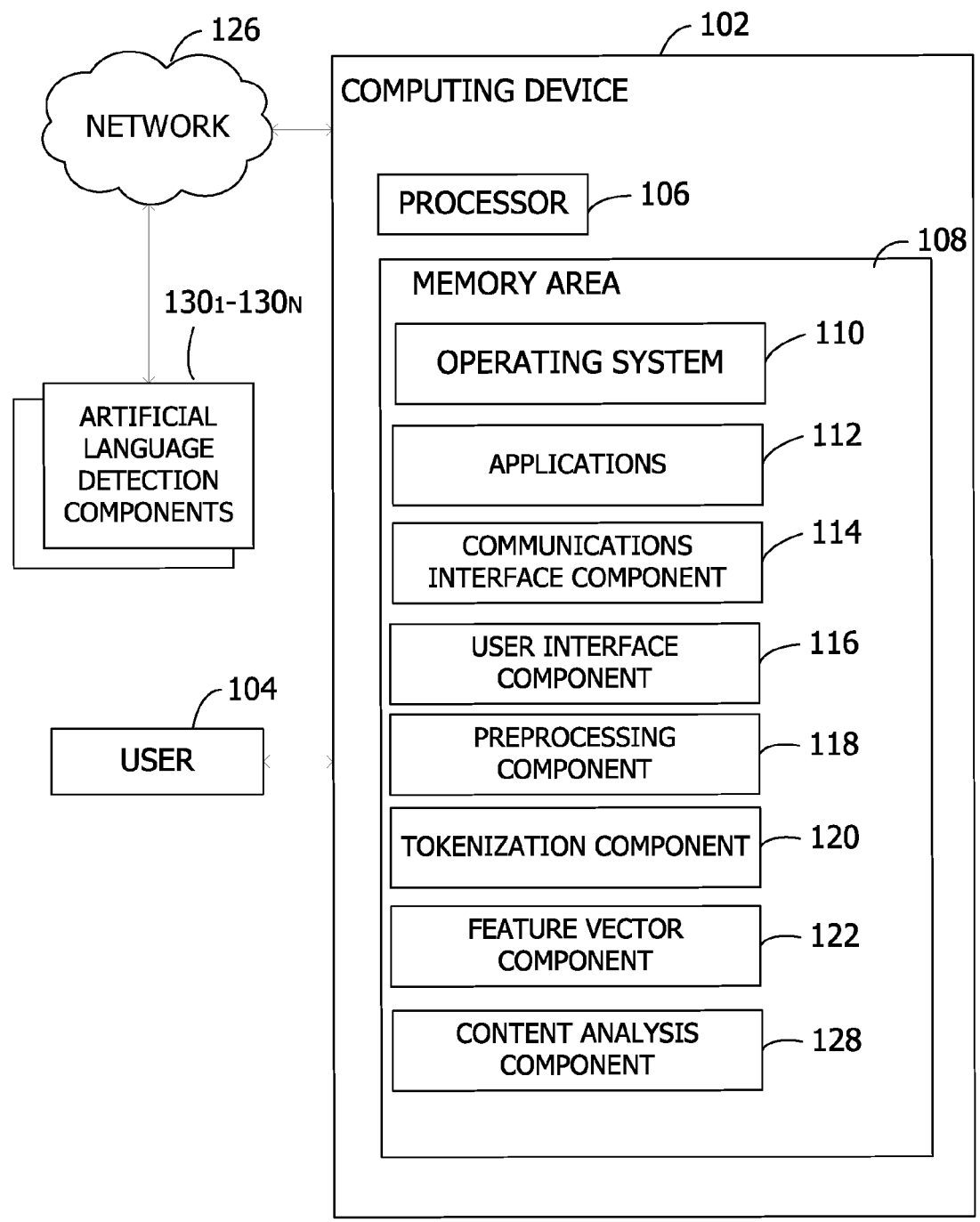
FIG. 1C is a block diagram of an operating environment for pre-processing a document that includes natural language text and artificial language.

In FIG. 1A, the computing device 102 is accessible by a user 104 and represents a system for identifying artificial language from natural language text within a document. The computing device 102 includes a processor 106, and a memory area 108. The memory area 108 stores instructions and device-specific drivers that include applications 112, communications interface component 114, user interface component 116, the pre-processing component 118, and content analysis component 128. These instructions, when processed by the processor 106, implement various operations and functionality associated with the computing device 102.

The computing device 102 may take the form of a mobile computing device or any other portable device. In some examples, the computing device 102 may be a mobile phone, laptop, tablet, computing pad, netbook, gaming device, and/or portable media player. The computing device 102 may also include less portable devices such as desktop personal computers, kiosks, tabletop devices, industrial control devices, wireless charging stations, gaming consoles, servers, electric automobile charging stations, control systems, and the like. Additionally, the computing device 102 may represent a group of processors or other computing devices 102. The computing device 102 is but one example of a suitable computing environment and is not intended to suggest any limitation as to the scope of use or functionality of the disclosed examples. Neither should the computing device 102 be interpreted as having any dependency or requirement relating to any one or combination of components illustrated.

The processor 106 may include any quantity of processing units, and is programmed to execute computer-executable instructions for implementing aspects of the disclosure. The instructions may be performed by the processor 106 or by multiple processors within the computing device, or performed by a processor external to the computing device. In some examples, the processor 106 is programmed to execute instructions to perform the actions specified in FIG. 2. Moreover, in some examples, the processor 106 represents an implementation of analog techniques to perform the operations described herein. For example, the operations may be performed by an analog computing device and/or a digital computing device.

The memory area 108 includes any quantity of computer-storage media associated with or accessible by the computing device 102. The memory area 108 may be internal to the computing device 102 (as shown in FIGS. 1A-1C), external to the computing device 102 (not shown), or both (not shown). Examples of memory stored in the memory area 108 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the computing device 102. Such memory may take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

Applications 112 are stored in the memory area 108. The applications 112, when executed by the processor 106, operate to perform functionality on the computing device 102. Exemplary applications 106 include mail application programs, web browsers, calendar application programs, gaming programs, address book application programs, messaging programs, media applications, location-based services, search programs, and the like. The applications 112 may communicate with counterpart applications or services such as web services accessible via a network 126. For example, the applications 112 may represent downloaded client-side applications that correspond to server-side services executing in a cloud and accessible over the network 126.

The network 126 may include any telecommunication or computer network. Examples of computer networks configurable to operate as the network 126 include, without limitation, a wireless network, landline, cable line, fiber-optic line, local area network (LAN), wide area network (WAN), or the like. The network may also comprise subsystems that transfer data between servers or computing devices. For example, network 126 may also include a point-to-point connection, the Internet, an Ethernet, a backplane bus, an electrical bus, a neural network, or other internal system.

In some examples, the communications interface component 114 includes a network interface card and/or computer-executable instructions (e.g., a driver) for operating a network interface card that provides access to the network 126. Communication between the computing device 102 and other devices over the network 126 may occur using any protocol or mechanism over any wired or wireless connection. In some examples, the communications interface is operable with short-range communication technologies such as by using near-field communication (NFC) tags, BLUETOOTH brand communications tags, or the like. Examples of network transfer protocols include, for example but without limitation, the hypertext transfer protocol (HTTP), file transfer protocol (FTP), simple object access protocol (SOAP), or the like. Requests and responses may be passed as different markup language messages—e.g., extensible markup language (XML), hypertext markup language (HTML), or the like—or as parameters for scripting languages. One skilled in the art will appreciate that numerous scripting languages may be used by different distributed applications, a list of which, while not exhaustive, includes JAVASCRIPT brand scripts, personal home page (PHP), or the like. Examples are not limited to any particular communication protocol, message language, or scripting language, as one skilled in the art will appreciate that different languages and protocols may be used to interact with distributed applications.

In some examples, the user interface component 116 includes a graphics card for displaying data to the user and receiving data from the user. The user interface component 116 may also include computer-executable instructions (e.g., a driver) for operating the graphics card. Further, the user interface component 116 may include a display (e.g., a touch screen display or natural user interface) and/or computer-executable instructions (e.g., a driver) for operating the display. The user interface component 116 may also include one or more of the following to provide data to the user or receive data from the user: speakers, a sound card, a camera, a microphone, a vibration motor, one or more accelerometers, joysticks, scanners, printers, a BLUETOOTH brand communication module, global positioning system (GPS) hardware, and a photoreceptive light sensor. For example, the user may input commands or manipulate data by moving the computing device 102 in a particular way.

The memory area 108 also stores one or more computer-executable components. As shown in each of FIGS. 1A-1C, example components include the pre-processing component 118, a tokenization component 120, an encoding component 122, a feature vector component 124, the content analysis component 128, and artificial language detection components $130_1$-$130_N$ that are executable by the processor 106. The components 118-124, 128, and $130_1$-$130_N$ may be implemented solely through software, firmware, or a combination of the two. Alternatively, in some examples, any of these components 118-124, 128, and $130_1$-$130_N$ may be executed remotely by a server or other computing device in communication over the network 126. For the sake of clarity, however, this disclosure focuses on components 118-124, 128, and $130_1$-$130_N$ being executed locally on the computing device 102, but alternative examples may remotely execute the pre-processing component 118, the tokenization component 120, the encoding component 122, the feature vector component 124, and the content analysis component 128. In addition, as shown in the example in FIG. 1A, the pre-processing component 118 may comprise the tokenization component 120, the encoding component 122, and the feature vector component 124. Alternatively, as sown in the example in FIG. 1B, each of the pre-processing component 118, the tokenization component 120, the encoding component 122, and the feature vector component 124 are stored separately within the memory area 108. Further, as shown in the example in FIG. 1C, the artificial language detection components $130_1$-$130_N$ are located on remote computing device 132 and are accessible to pre-processing component 118 using the network 126. In some examples, the remote computing device 132 is a server or cloud infrastructure.

The pre-processing component 118, when executed, causes the processor 106 to receive a request to prepare a document that includes natural language text and artificial language text for content analysis. However, to enable results of the content analysis to be free of noise or inaccuracies due to the inclusion of the artificial language currently in the document, the pre-processing component 116 identifies and removes the artificial language from the document. Some of the artificial language, such as HTML tags and uniform resource locators (URLS) are easily identified and can be removed without further processing. However, the document may also include artificial language that is in plain text within the natural language text, and thus further processing is needed to identify any artificial language in plain text.

The tokenization component 120, when executed, causes the processor 106 to segment the document into a plurality of sequential terms (e.g., clauses, phrases, sentences, and paragraphs). For each of the plurality of sentences, the tokenization component 120 parses the sentences into tokens based on a plurality of delimiters. Delimiters are generally divided into two groups: "white space" delimiters and "punctuation/special character" delimiters. White space delimiters include, for example, spaces, tabs, newlines, and carriage returns. Punctuation/special character delimiters include, for example, non-alphanumeric characters such as a comma, a period, an exclamation mark, a percent sign, a plus sign, a parenthesis, a slash, an asterisk, an ampersand, a dollar sign, a number sign, a hyphen-minus, and the like. In one example, the list of delimiters is configurable and may be adjusted by a user/administrator to add or remove particular punctuation and/or special characters from the list of punctuations and special characters listed as delimiters. For example, an underscore and/or quotations may be removed given they are more closely related to/a part of many natural language text. Example 1 provided below illustrates a segmented sentence before and after it is tokenized with an underscore being removed from the list of delimeters.

Example 1

Segmented Sentence Before Tokenization:
MODIFY(EDITION='basic SERVICE_OBJECTED in memory of his now dead race 4
Segmented Sentence After Tokenization:
[MODIFY , ( , EDITION , =, ' , basic, SERVICE_OBJECTED, in, memory, of, his, now, dead, race, 4,]

The encoding component 122, when executed, causes the processor 106 to encode each of the tokenized sentences by replacing each token in the tokenized sentences with a term that is specific to a particular type of artificial language. That is, to provide a complete analysis/review of the document for identifying artificial language, the processes describe herein are enabled to identify several different types of artificial language, such as C Language, C++, Java, JAVASCRIPT brand scripts, Structured Query Language (SQL), PYTHON brand scripts, Hypertext Processor (PHP), and the like. As such, to provide an encoded sentence specific to each artificial language that may be represented within the document, the encoding component 122 duplicates the tokenized sentences for every artificial language being analyzed. Thus, a tokenized sentence that is going to be analyzed for terms used in C++ or Java would result in two encoded sentences being generated. One encoded sentence being encoded with terms for C++ analysis and the other encoded sentence being encoded with terms for Java analysis.

While each tokenized sentence is encoded for each artificial language being analyzed, each token is encoded by the encoding component 122 based on a list of rules. The following is a description of each rule in the list of rules, along with an explanation of how they are applied.

Rule for Encoding Keywords

If the token is one of the keywords in the artificial language being analyzed, then a bag-of-words (BOW) encoding approach is used to encode the token. For each identified keyword, the token is replaced/encoded with the term "KEYWORD" followed by a number that uniquely identifies what that keyword is for that particular artificial language. A table that maps each keyword for each artificial language being analyzed may be stored in the memory area 108. The table maps each keyword to a number that represents that particular keyword for the corresponding artificial language. As shown in Example 2 below, the token "MODIFY" is identified as keyword and thus encoded as <KEYWORD-10>. In this example, the table stored in the memory area 108 lists the term "modify" as a keyword with the number "10" listed as the number that represents the keyword "modify" for that particular artificial language. In addition, as shown in Example 2 below, the term EDITION is also identified as a keyword, and as a result, is encoded as <KEYWORD-23>, with the number "23" listed as the number that represents the keyword "edition," for that particular artificial language.

Rule for Encoding English Dictionary Words

If the token is an English dictionary word that is not an artificial language specific keyword, the token is encoded with a fixed value. The memory area 108 stores a table with a list of English dictionary words that is used by the encoding component 122 to look up, verify, and identify tokens as English dictionary words. While the example provides mapping tokens to English dictionary words, a list of dictionary words in other languages may also be stored in the memory area 108 and used to map to tokens during the encoding process. As shown in Example 2 below, the tokens "basic," "in", "memory", "of", "his", "now", "dead", and "race" are each identified as English dictionary words that are not keywords in the particular artificial language being analyzed. As such, each of the tokens "basic," "in", "memory", "of", "his", "now", "dead", and "race" are replaced with the term <TEXT>.

Rule for Alpha Numeric Tokens

All alpha numeric tokens that are not identified as keywords or English dictionary words are replaced/encoded with the term <VAR>. As shown in Example 2 below, the token "SERVICE_OBJECTED" is identified as an alpha numeric token that is not a keyword for the particular artificial language being analyzed and is not an English dictionary word. As such, the token "SERVICE_OBJECTED" is replaced/encoded with the term <VAR>.

Rule for Numeric Tokens

All numeric tokens are replaced/encoded with the term <NUM>. As shown in Example 2 below, the token "4" is identified as a numeric token. As such, the token "4" is replaced/encoded with the term <NUM>.

Rule for Punctuation/Special Characters

Tokens that are a combination of one or more punctuations or special characters are replaced/encoded with the term <PUNCT>. As shown in Example 2 below, tokens "(" and """ are identified as a combination of one or more punctuations or special characters. As such, the tokens "(" and """ are replaced/encoded with the term <PUNCT>.

Example 2

Segmented Sentence After Tokenization:
[MODIFY , ( , EDITION , =, ' , basic, SERVICE_OBJECTED, in, memory, of, his, now, dead, race]
Segmented Sentence After Encoding:
[<KEYWORD-10>, <PUNCT>, <KEYWORD-23>, <PUNCT>, <TEXT>, <VAR>, <TEXT>, <TEXT>, <TEXT>, <TEXT>, <TEXT>, <TEXT>, <TEXT>, <NUM>]

The feature vector component 124, when executed, causes the processor 106 to generate feature vectors from the encoded sentence using an n-gram and a sliding window approach. As discussed in further detail below, each of the artificial language detection components $130_1$-$130_N$ correspond to respective artificial languages. Further, each of the artificial language detection components $130_1$-$130_N$ include models that utilize machine learning algorithms to identify patterns for the particular artificial language they represent. These models are trained to identify a particular artificial language from a predefined number of terms in a sequence. As such, the feature vector component 124 generates feature vectors that include a number of encoded tokens equal to the predefined number of terms used to train each of the models in the artificial language detection components $130_1$-$130_N$.

For example, as shown in Example 3 below, a 5-gram (e.g., the predefined number of encoded tokes is five, thus n=5) is used to generate the feature vectors, and thus, the predefined number of terms used to train each of the models in the artificial language detection components $130_1$-$130_N$ is also 5. While the examples provided herein use the predefined number of 5, any number greater than or equal to "1" may be used as the predefined number. As the predefined number increases, the accuracy of identifying artificial language from the feature vectors also increases. However, in order to compensate for smaller sized documents (e.g., documents with fewer text included therein) and to increase the possibility of the models in the artificial language detection components $130_1$-$130_N$ identifying artificial language from a smaller set of terms, the predefined number should be limited (e.g., less than 20).

Further, the models in the artificial language detection components $130_1$-$130_N$ are trained to identify a single encoded token (e.g., a pivot token) from each feature vector as either artificial language or not artificial language. The terms surrounding the pivot term (e.g., the term being analyzed) give the pivot term context during the analysis. The artificial language detection components $130_1$-$130_N$ are trained to identify patterns from a plurality of terms in a sequence to determine whether the pivot term is artificial language or not artificial language. For example, if the predefined number was "1", and thus only a single encoded token is in each feature vector, the single encoded token may be identified as artificial language (e.g., it may be a keyword in the particular artificial language being analyzed). However, if terms surrounding the single encoded token were analyzed with the single encoded token (e.g., the feature vector includes 3 more encoded tokens), the single encoded token may not be identified as artificial language as the terms adjacent to the single encoded token give the single encoded token context. For example, as whole, the single encoded token and the terms adjacent to the single encoded token may not fit a pattern recognized by models in the artificial language detection components $130_1$-$130_N$, and therefore, the single encoded token that would be falsely identified as artificial language if analyzed by itself, is properly identified as not artificial language when analyzed together with other encoded terms.

To increase accuracy of identifying a pivot term as either artificial language or not artificial language, the number of encoded tokens on either side of the pivot term is the same (e.g., equal). Thus, to enable the number of encoded tokens on either side of the encoded token being analyzed to be the same, the number of encoded tokens in each feature vector is odd (e.g., the predefined number is an odd number). Further, while a greater number of encoded tokens enable the models in the artificial language detection components $130_1$-$130_N$ to more accurately identify artificial language, the smaller the number of encoded tokens being analyzed enables the models in the artificial language detection components $130_1$-$130_N$ to better identify artificial language from documents that are smaller in size (e.g., include a small number of terms). For example, if a document only included 10 terms, and the predefined number used in the feature vectors is 15, then the document with only 10 terms could not be accurately analyzed for artificial language as the models in the artificial language detection components $130_1$-$130_N$ would not have been trained to analyze only 10 terms (e.g., they were trained with 15 terms). Thus, the predefined number should be high enough for increased accuracy, but low enough to enable smaller documents to be analyzed properly. As shown in Example 3 below, the predefined number is 5 (e.g., a 5-gram) resulting in feature vectors that include 5 encoded tokens. A predefined number of 5 is an odd number (thus having equal number of encoded tokens on either side), is large enough for increased accuracy for pattern recognition, and is small enough to analyze smaller documents.

To generate feature vectors with a predefined number of encoded tokens, the feature vector component 124 utilizes a sliding window with a boundary size equal to the predefined number used in the feature vectors. Thus, in Example 3 below, the boundary size of the sliding window used by the feature vector 124 is 5. Starting with the first encoded token in the segmented sentence, the sliding window "slides" (logically) over the encoded tokens until the number of encoded tokens equals the boundary size (e.g., 5) of the sliding window. For example, as shown in Example 3 below, the encoded token "KEYWORD-10" is the first encoded token in the segmented sentence. The sliding window "slides" (logically) over the encoded tokens until the number of encoded tokens equals the boundary size of the sliding window (e.g., 5). As shown in Example 3, Feature Vector 1 includes 5 encoded tokens, the first encoded token in Feature Vector 1 being "<KEYWORD-10>" and the last encoded token (the fifth encoded token in the segmented sentence) in Feature Vector 1 being "<TEXT>". To generate another feature vector from the segmented sentence (e.g., Feature Vector 2 in Example 3), the sliding window "slides" (logically) over by one encoded token resulting in Feature Vector 2 shown in Example 3 below. This process is repeated until the sliding window encompasses the last encoded token in the segmented sentence (e.g., <NUM> in Example 3) creating a feature vector each time the sliding window "slides".

Prior to processing each of the feature vectors through the models in the artificial language detection components $130_1$-$130_N$, the feature vector component 124 maps each encoded token in each feature to a numeric value that represents the particular encoded token. The table mapping each of the encoded tokens to a numeric value may be stored in the memory area 106. As shown in Example 3 below, number 134 represents <KEYWORD-10>, number 21 represents <PUNCT>, number 145 represents <KEYWORD-23>, number 15 represents <PUNCT>, and number 1 represents <TEXT>, resulting in the translated Feature Vector 1 being [130, 21, 145, 15, 1]. As explained above, only the pivot token (e.g., the centermost encoded token) in each feature vector is analyzed to determine whether the pivot token is artificial language or not artificial language. Thus, as shown in Example 3, the pivot token in Feature Vector 1 is "15", the pivot token in Feature Vector 2 is "15", the pivot token in Feature Vector 3 is "1", the pivot token in Feature Vector 4 is "2", the pivot token in Feature Vector 5 is "1", the pivot token in Feature Vector 6 is "1", the pivot token in Feature Vector 7 is "1", the pivot token in Feature Vector 8 is "1".

Example 3

Feature Vector 1:
[<KEYWORD-10>, <PUNCT>, <KEYWORD-23>, <PUNCT>, <TEXT>]→[130, 21, 145, 15, 1]
Feature Vector 2:
[<PUNCT>, <KEYWORD-23>, <PUNCT>, <TEXT>, <VAR>]→[21, 145, 15, 1, 2]
Feature Vector 3:
[<KEYWORD-23>, <PUNCT>, <TEXT>, <VAR>, <TEXT>]→[145, 15, 1, 2, 1]
Feature Vector 4:
[<PUNCT>, <TEXT>, <VAR>, <TEXT>, <TEXT>]→[15, 1, 2, 1, 1]
Feature Vector 5:
[<TEXT>, <VAR>, <TEXT>, <TEXT>, <TEXT>]→[1, 2, 1, 1, 1]
Feature Vector 6:
[<VAR>, <TEXT>, <TEXT>, <TEXT>, <TEXT>]→[2, 1, 1, 1, 1]
Feature Vector 7:
[<TEXT>, <TEXT>, <TEXT>, <TEXT>, <TEXT>]→[1, 1, 1, 1, 1]
Feature Vector 8:
[<TEXT>, <TEXT>, <TEXT>, <TEXT>, <NUM>]→[1, 1, 1, 1, 3]

After each of the translated feature vectors have been generated, the preprocessing component 118 (or the feature vector component 124) sends the translated feature vectors through each of the models in the artificial language detection components $130_1$-$130_N$. As each of the models in the artificial language detection components $130_1$-$130_N$ correspond to a particular artificial language, each translated feature vector can be processed in a parallel through all of the models in the artificial language detection components $130_1$-$130_N$.

When a feature vector is processed through each of the models in the artificial language detection components $130_1$-$130_N$, if any of the models in the artificial language detection components $130_1$-$130_N$ identify a pivot token as artificial language in the feature vector being processed, the pivot token is labeled as artificial language. Thus, to determine and label a pivot token as not artificial language, none of the models in the artificial language detection components $130_1$-$130_N$ should identify the pivot token as artificial language.

Upon receiving the results from each of the models in the artificial language detection components $130_1$-$130_N$, the preprocessing component 118 presents the results to a user and/or removes any term from the document being analyzed that is identified as artificial language. In some implementations, prior to presenting or removing the terms identified as artificial language, post processing/smoothing is applied to the results to ensure the results are accurate and to optimize/fine tune/update each of the models in the artificial language detection components $130_1$-$130_N$ to ensure future results are more accurate, After each of the identified artificial language is removed from the document, the content analysis component 128, when executed, causes processor 106 to perform content analysis on the document. In some examples, prior to removing terms identified as artificial language, the preprocessing component 118 may present results to a user to enable the user to review the results prior to removing the terms from the document. This enables the user to identify errors in the results and utilize these found errors to tweak the models in the artificial language detection components $130_1$-$130_N$ to reduce the likelihood of the errors happening again. In some examples, the identified artificial language is not removed from the document. Rather, the preprocessing component 118 may identify the identified artificial language by using color codes or brackets that surround each term identified as artificial language or each sequence (e.g., two or more terms) of identified artificial language.

Figure 2:
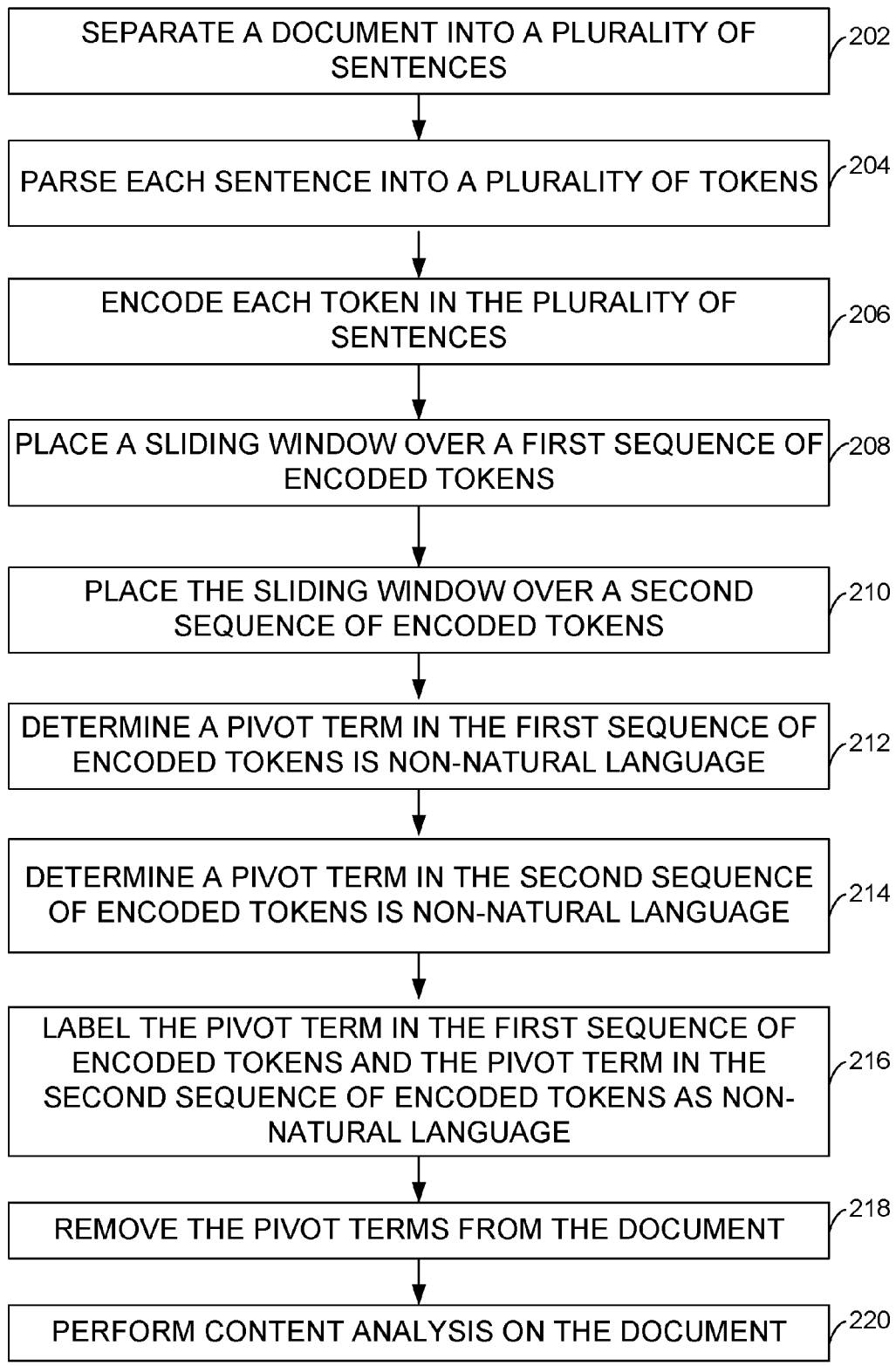
FIG. 2 is an exemplary flow chart illustrating pre-processing of a document that includes natural language text and artificial language.

FIG. 2 is a flowchart diagram of a work flow 200 for detecting and removing non-natural language (e.g., artificial language) from a document that includes natural language. The document is separated (e.g., segmented) into a plurality of sentences, as shown at block 202. Each of the plurality of sentences are parsed into tokens (e.g., tokenized) based on a plurality of rules (e.g., rules stored in the memory area 106), as shown in block 204. Each of the parsed tokens in the tokenized sentences is replaced with a term (e.g., encoded) that is specific to a particular non-natural language, as shown in block 206. A sliding window having a defined length is placed over a first sequence terms (e.g., encoded tokens) in a sentence, as shown in block 208. In some implementations, the defined length of the sliding window is a variable length that changes as the sliding window "slides" over a next sequence of terms. The first sequence of terms comprises a first term, a second term (e.g., the pivot term in the first sequence of terms), and a third term, wherein the first term and the third term are adjacent to the second term. The sliding window is then placed over a second sequence of terms from the plurality of terms, as shown in block 210. The second sequence of terms comprising the second term, the third term (e.g., the pivot term in the second sequence of terms), and a fourth term, wherein the second term and the fourth term are adjacent to the third term. Based on the first term, the second term, and the third term in the first sequence of terms, it is determined whether the second term (the pivot term) represents non-natural language, as shown in block 212. Based on the second term, the third term, and the fourth term in the second sequence of terms, determining whether the third term (the pivot term) represents non-natural language, as shown in block 214. Upon determining that the second term and the third term are non-natural language, the second term and the third term are labeled as non-natural language, as shown in block 216. Based on determining the second term and the third term are non-natural language, the second term and the third term are removed from the document, as shown in block 218. Upon removing the terms identified as non-natural language, content analysis is performed on the document, as shown in block 220.

In some examples, the operations illustrated in FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Some examples are further discussed shortly in the following.

In a first aspect, a system may comprise a memory storing a non-natural language model for detecting non-natural language. The system may further comprise a processor programmed to: identify a plurality of terms in a phrase; place a sliding window having a defined length over a first sequence of terms from the plurality of terms, the first sequence of terms comprising a first term, a second term, and a third term, the first term and the third term being adjacent to the second term; process the first term, the second term, and the third term through the non-natural language model to determine whether the second term represents non-natural language; as a result of the processing, receive an indication that the second term is non-natural language; upon receiving the indication that the second term is non-natural language, label the first term as non-natural language; and remove the second term from the plurality of terms based on the indication that the second term is non-natural language to enhance performing content analysis on natural language in the phrase.

In an example which may be in accordance with the preceding example, the processor is further programmed to, upon removing the second term from the plurality of terms, perform the content analysis on the plurality of terms.

In an example which may be in accordance with any of the preceding examples, the processor is further programmed to: place the sliding window over a second sequence of terms from the plurality of terms, the second sequence of terms comprising the second term, the third term, and a fourth term, the second term and the fourth term being adjacent to the third term; process the second term, the third term, and the fourth term, through the non-natural language model to determine whether the third term represents non-natural language; and upon receiving the indication that the third term is non-natural language, label the third term as non-natural language.

In an example which may be in accordance with any of the preceding examples, the processor is further programmed to: based on the indication that the second term and the third term are non-natural language, remove the second term and the third term from the plurality of terms; and upon removing the second term and the third term from the plurality of terms, perform the content analysis on the plurality of terms.

In an example which may be in accordance with any of the preceding examples, the second term is located between the first term and the third term, and wherein the third term is located between the second term and the fourth term.

In an example which may be in accordance with any of the preceding examples, the sliding window encompasses a pre-defined odd number of terms in a sequence.

In an example which may be in accordance with any of the preceding examples, the non-natural language model is trained to analyze the pre-defined odd number of terms in the sequence.

In an example which may be in accordance with any of the preceding examples or in a second aspect, a computer-implemented method may comprise: identifying a plurality of terms in a phrase; placing a sliding window having a defined length over a first sequence of terms from the plurality of terms, the first sequence of terms comprising a first term, a second term, and a third term, the first term and the third term being adjacent to the second term; based on the first term, the second term, and the third term, determining whether the second term represents non-natural language; upon determining that the second term is non-natural language, labeling the second term as non-natural language; and removing the second term from the plurality of terms based on determining the second term as non-natural language to enhance performing content analysis on natural language in the phrase.

In an example which may be in accordance with any of the preceding examples, upon removing the second term from the plurality of terms, performing the content analysis on the plurality of terms.

In an example which may be in accordance with any of the preceding examples, placing the sliding window over a second sequence of terms from the plurality of terms, the second sequence of terms comprising the second term, the third term, and a fourth term, the second term and the fourth term being adjacent to the third term; based on the second term, the third term, and the fourth term, determining whether the third term represents non-natural language; and upon determining that the third term is non-natural language, labeling the third term as non-natural language.

In an example which may be in accordance with any of the preceding examples, upon determining the second term and the third term are non-natural language, removing the second term and the third term from the plurality of terms; and upon removing the second term and the third term from the plurality of terms, performing the content analysis on the plurality of terms.

In an example which may be in accordance with any of the preceding examples, the second term is located between the first term and the third term, and wherein the third term is located between the second term and the fourth term.

In an example which may be in accordance with any of the preceding examples, the sliding window encompasses a pre-defined odd number of terms in a sequence.

In an example which may be in accordance with any of the preceding examples, determining whether the second term represents non-natural language comprises placing the second sequence of terms in a non-natural language model, the non-natural language model being trained to analyze the pre-defined odd number of terms in the sequence.

In an example which may be in accordance with any of the preceding examples or in a third aspect, one or more computer-readable storage media may comprise computer-executable instructions that upon execution by a processor, cause the processor to: identify a plurality of terms in a phrase; place a sliding window having a defined length over a first sequence of terms from the plurality of terms, the first sequence of terms comprising a first term, a second term, and a third term, the first term and the third term being adjacent to the second term; based on the first term, the second term, and the third term, determine whether the second term represents non-natural language; upon determining that the second term is non-natural language, label the second term as non-natural language; and remove the second term from the plurality of terms based on determining the second term as non-natural language to enhance performing content analysis on natural language in the phrase.

In an example which may be in accordance with any of the preceding examples, the computer-executable instructions further cause the processor to, upon removing the second term from the plurality of terms, perform the content analysis on the plurality of terms.

In an example which may be in accordance with any of the preceding examples, the computer-executable instructions further cause the processor to: place the sliding window over a second sequence of terms from the plurality of terms, the second sequence of terms comprising the second term, the third term, and a fourth term, the second term and the fourth term being adjacent to the third term; based on the second term, the third term, and the fourth term, determine whether the third term represents non-natural language; and upon determining that the third term is non-natural language, label the third term as non-natural language.

In an example which may be in accordance with any of the preceding examples, the computer-executable instructions further cause the processor to: upon determining the second term and the third term are non-natural language, remove the second term and the third term from the plurality of terms; and upon removing the second term and the third term from the plurality of terms, perform the content analysis on the plurality of terms.

In an example which may be in accordance with any of the preceding examples, the second term is located between the first term and the third term, and wherein the third term is located between the second term and the fourth term.

In an example which may be in accordance with any of the preceding examples, the sliding window encompasses a pre-defined odd number of terms, and wherein determining whether the second term represents non-natural language comprises placing the first set of terms in a non-natural language model, the non-natural language model being trained to analyze the pre-defined odd number of terms.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for detecting and removing non-natural language within natural language to enhance performing analysis on the natural language. For example, the elements illustrated in FIGS. 1A-1C, such as when encoded to perform the operations illustrated in FIG. 3, constitute exemplary means for identifying a plurality of terms in a phrase, exemplary means for placing a sliding window having a defined length over a first sequence of terms from the plurality of terms, the first sequence of terms comprising a first term, a second term, and a third term, the first term and the third term being adjacent to the second term, exemplary means for determining whether the second term represents non-natural language based on the first term, the second term, and the third term, exemplary means for labeling the second term as non-natural language upon determining that the second term is non-natural language, exemplary means for removing the second term from the plurality of terms based on determining the second term as non-natural language, and exemplary means for performing content analysis on the plurality of terms upon removing the second term from the plurality of terms.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a memory storing a non-natural language model for detecting non-natural language; and
a processor programmed to:
identify a plurality of terms in a phrase;
place a sliding window having a defined length over a first sequence of terms from the plurality of terms, the first sequence of terms comprising a first term, a second term, and a third term, the first term and the third term being adjacent to the second term;
process the first term, the second term, and the third term through the non-natural language model to determine whether the second term represents non-natural language;
as a result of the processing, receive an indication that the second term is non-natural language; and
upon receiving the indication that the second term is non-natural language, label the second term as non-natural language to omit the second term from content analysis of the phrase.

2. The system of claim 1, wherein the processor is further programmed to perform the content analysis on the plurality of terms without the second term.

3. The system of claim 1, wherein the processor is further programmed to:
place the sliding window over a second sequence of terms from the plurality of terms, the second sequence of terms comprising the second term, the third term, and a fourth term, the second term and the fourth term being adjacent to the third term;
process the second term, the third term, and the fourth term, through the non-natural language model to determine whether the third term represents non-natural language; and
upon receiving the indication that the third term is non-natural language, label the third term as non-natural language to omit the third term from the content analysis of the phrase.

4. The system of claim 3, wherein the processor is further programmed to:
based on the indication that the second term and the third term are non-natural language, remove the second term and the third term from the plurality of terms; and
upon removing the second term and the third term from the plurality of terms, perform the content analysis on the plurality of terms.

5. The system of claim 3, wherein the second term is located between the first term and the third term, and wherein the third term is located between the second term and the fourth term.

6. The system of claim 1, wherein the sliding window encompasses a pre-defined odd number of terms in a sequence.

7. The system of claim 6, wherein the non-natural language model is trained to analyze the pre-defined odd number of terms in the sequence.

8. A computer-implemented method comprising:
identifying a plurality of terms in a phrase;
placing a sliding window having a defined length over a first sequence of terms from the plurality of terms, the first sequence of terms comprising a first term, a second term, and a third term, the first term and the third term being adjacent to the second term;
based on the first term, the second term, and the third term, determining whether the second term represents non-natural language; and
upon determining that the second term is non-natural language, labeling the second term as non-natural language to omit the second term from content analysis of the phrase.

9. The computer-implemented method of claim 8, further comprising performing the content analysis on the plurality of terms.

10. The computer-implemented method of claim 8, further comprising:
   placing the sliding window over a second sequence of terms from the plurality of terms, the second sequence of terms comprising the second term, the third term, and a fourth term, the second term and the fourth term being adjacent to the third term;
   based on the second term, the third term, and the fourth term, determining whether the third term represents non-natural language; and
   upon determining that the third term is non-natural language, labeling the third term as non-natural language to omit the third term from the content analysis of the phrase.

11. The computer-implemented method of claim 10, further comprising:
   upon determining the second term and the third term are non-natural language, removing the second term and the third term from the plurality of terms; and
   upon removing the second term and the third term from the plurality of terms, performing the content analysis on the plurality of terms.

12. The computer-implemented method of claim 10, wherein the second term is located between the first term and the third term, and wherein the third term is located between the second term and the fourth term.

13. The computer-implemented method of claim 8, wherein the sliding window encompasses a pre-defined odd number of terms in a sequence.

14. The computer-implemented method of claim 13, wherein determining whether the second term represents non-natural language comprises placing the first sequence of terms in a non-natural language model, the non-natural language model being trained to analyze the pre-defined odd number of terms in the sequence.

15. One or more computer-readable storage media comprising computer-executable instructions that, upon execution by a processor, cause the processor to:
   identify a plurality of terms in a phrase;
   place a sliding window having a defined length over a first sequence of terms from the plurality of terms, the first sequence of terms comprising a first term, a second term, and a third term, the first term and the third term being adjacent to the second term;
   based on the first term, the second term, and the third term, determine whether the second term represents non-natural language; and
   upon determining that the second term is non-natural language, label the second term as non-natural language to omit the second term from content analysis of the phrase.

16. The one or more computer-readable storage media of claim 15, wherein the computer-executable instructions further cause the processor to perform the content analysis on the plurality of terms.

17. The one or more computer-readable storage media of claim 15, wherein the computer-executable instructions further cause the processor to:
   place the sliding window over a second sequence of terms from the plurality of terms, the second sequence of terms comprising the second term, the third term, and a fourth term, the second term and the fourth term being adjacent to the third term;
   based on the second term, the third term, and the fourth term, determine whether the third term represents non-natural language; and
   upon determining that the third term is non-natural language, label the third term as non-natural language to omit the third term from the content analysis of the phrase.

18. The one or more computer-readable storage media of claim 17, wherein the computer-executable instructions further cause the processor to:
   upon determining the second term and the third term are non-natural language, remove the second term and the third term from the plurality of terms; and
   upon removing the second term and the third term from the plurality of terms, perform the content analysis on the plurality of terms.

19. The one or more computer-readable storage media of claim 17, wherein the second term is located between the first term and the third term, and wherein the third term is located between the second term and the fourth term.

20. The one or more computer-readable storage media of claim 15, wherein the sliding window encompasses a pre-defined odd number of terms, and wherein determining whether the second term represents non-natural language comprises placing the first sequence of terms in a non-natural language model, the non-natural language model being trained to analyze the pre-defined odd number of terms.

* * * * *